United States Patent
Mäntyla et al.

(10) Patent No.: US 7,680,213 B2
(45) Date of Patent: Mar. 16, 2010

(54) GENERATING HIGHER ORDER MODULATION USING QPSK MODULATIONS

(75) Inventors: Jyrki Mäntyla, Oulu (FI); Risto Alasaarela, Oulu (FI); Tapio M. Heikkilä, Oulunsala (FI)

(73) Assignee: Nokia Corporation, Espoo (FI)

( * ) Notice: Subject to any disclaimer, the term of this patent is extended or adjusted under 35 U.S.C. 154(b) by 1352 days.

(21) Appl. No.: 10/920,349

(22) Filed: Aug. 18, 2004

(65) Prior Publication Data

US 2005/0232374 A1   Oct. 20, 2005

(30) Foreign Application Priority Data

Apr. 14, 2004   (EP)   .................... 04008868

(51) Int. Cl.
   *H04L 27/20*   (2006.01)
   *H03C 3/00*   (2006.01)

(52) U.S. Cl. ....................... 375/308; 332/103

(58) Field of Classification Search ................ 375/261, 375/271, 279, 281, 298, 308; 332/103–104
   See application file for complete search history.

(56) References Cited

U.S. PATENT DOCUMENTS

| | | | |
|---|---|---|---|
| 4,571,549 A | | 2/1986 | Lods et al. |
| 4,999,590 A | * | 3/1991 | Verdot ......................... 332/104 |
| 5,237,292 A | * | 8/1993 | Chethik ....................... 332/103 |
| 5,463,355 A | * | 10/1995 | Halloran ..................... 332/103 |
| 5,815,531 A | | 9/1998 | Dent |
| 5,867,071 A | * | 2/1999 | Chethik ....................... 332/103 |
| 6,593,827 B2 | * | 7/2003 | Chethik et al. .............. 332/103 |
| 6,674,811 B1 | * | 1/2004 | Desrosiers et al. .......... 375/298 |
| 7,078,981 B2 | * | 7/2006 | Farag ........................ 332/103 |
| 7,079,585 B1 | * | 7/2006 | Settle et al. ................. 375/261 |
| 2003/0147472 A1 | | 8/2003 | Bach et al. |

FOREIGN PATENT DOCUMENTS

| | | |
|---|---|---|
| EP | 0583059 A1 | 2/1994 |
| EP | 0783218 A2 | 7/1997 |
| EP | 1418723 A1 | 5/2004 |
| WO | WO 03/053021 A1 | 6/2003 |

* cited by examiner

*Primary Examiner*—Khanh C Tran
(74) *Attorney, Agent, or Firm*—Squire, Sanders & Dempsey, L.L.P.

(57) ABSTRACT

A method and system generates a higher order modulation, in which a complex sequence of binary digits corresponding to symbols of a higher order modulation is received. The symbols correspond to constellation points of the higher order modulation. First mapping means map the symbols of the higher order modulation to first constellation points of a first QPSK modulation and output an output signal of the first QPSK modulation corresponding to the first constellation points. Similarly, second mapping means map the symbols of the higher order modulation to second constellation points of a second QPSK modulation and output an output signal of the second QPSK modulation corresponding to the second constellation points. Adding means add the output signals of the first and second QPSK modulations, thereby generating the constellation points of the higher order modulation.

16 Claims, 4 Drawing Sheets

Mapping Table

| 16QAM symbols ($I_1q_1i_2q_2$) | 16QAM I branch weight | 16QAM Q branch weight | SprA, I weight (0,8944) | SprA, Q weight (0,8944) | SprB, I weight (0.4472) | SprB, Q weight (0.4472) |
|---|---|---|---|---|---|---|
| 0000 | 0.4472 | 0.4472 | 1 | 1 | -1 | -1 |
| 0001 | 0.4472 | 1.3416 | 1 | 1 | -1 | 1 |
| 0010 | 1.3416 | 0.4472 | 1 | 1 | 1 | -1 |
| 0011 | 1.3416 | 1.3416 | 1 | 1 | 1 | 1 |
| 0100 | 0.4472 | -0.4472 | 1 | -1 | -1 | 1 |
| 0101 | 0.4472 | -1.3416 | 1 | -1 | -1 | -1 |
| 0110 | 1.3416 | -0.4472 | 1 | -1 | 1 | 1 |
| 0111 | 1.3416 | -1.3416 | 1 | -1 | 1 | -1 |
| 1000 | -0.4472 | 0.4472 | -1 | 1 | 1 | -1 |
| 1001 | -0.4472 | 1.3416 | -1 | 1 | 1 | 1 |
| 1010 | -1.3416 | 0.4472 | -1 | 1 | -1 | -1 |
| 1011 | -1.3416 | 1.3416 | -1 | 1 | -1 | 1 |
| 1100 | -0.4472 | -0.4472 | -1 | -1 | 1 | 1 |
| 1101 | -0.4472 | -1.3416 | -1 | -1 | 1 | -1 |
| 1110 | -1.3416 | -0.4472 | -1 | -1 | -1 | 1 |
| 1111 | -1.3416 | -1.3416 | -1 | -1 | -1 | -1 |

Fig. 3

GENERATING HIGHER ORDER MODULATION USING QPSK MODULATIONS

FIELD OF THE INVENTION

In general, the invention relates to signal modulation in a communication system. In particular, the invention relates to the generation of higher order modulations with QPSK modulations.

BACKGROUND OF THE INVENTION

In some current communication networks, e.g. in a WCDMA (Wideband Code Division Multiple Access) system, the normal downlink (and uplink) modulation is QPSK (Quadrature Phase Shift Keying). A service HSDPA (High Speed Downlink Packet Access) introduces new modulation schemes. 16QAM (QAM=Quadrature Amplitude Modulation) is accepted modulation method in 3GGP standardization. A problem is how to generate this higher order constellation with existing (on hardware) QPSK modulators.

In WO 03/053021 QPSK modulators are used together or separate for constellation points of a higher order modulation. For example, as shown in FIG. 4, a spreader A QPSK modulator (SprA) handles constellation points of a 16QAM modulation which are marked by x-marks. A spreader B (SprB) handles constellation points of the 16QAM modulation which are marked by +-marks. The other constellation points are handled by using both modulators together. The weights of the QPSK spreaders can be constant for different 16QAM symbols, the spreader A having three times bigger weights (i.e. 9.5 dB) than spreader B. FIG. 4 illustrates a creation of the constellation points "0011" and "1101". Discontinuous Transmission (DTX) bits are used for disabling branches of the QPSK modulators for forming the constellation points of the 16QAM modulation. According to the proposal disclosed in the WO 03/053021, a 16QAM is built up by using two spreaders with constant weights and variable DTX.

SUMMARY OF THE INVENTION

It is an object of the invention to provide an improved method, apparatus and system for generating higher order modulations using QPSK modulations.

According to an aspect of the invention, a QPSK modulating apparatus and method for generating a higher order modulation are provided. A complex sequence of binary digits corresponding to symbols of a higher order modulation is received, the symbols corresponding to constellation points of the higher order modulation. The symbols of the higher order modulation are mapped to constellation points of the QPSK modulating apparatus in order to provide an output signal of the QPSK modulating apparatus which is added to an output signal of at least one other QPSK modulating apparatus, in order to generate the constellation points of the higher order modulation.

According to another aspect of the invention a system for generating a higher order modulation is provided. The system comprises:

a first QPSK modulating apparatus comprising:
first receiving means for receiving a complex sequence of binary digits corresponding to symbols of a higher order modulation, the symbols corresponding to constellation points of the higher order modulation; and
first mapping means for mapping the symbols of the higher order modulation to first constellation points of the first QPSK modulating apparatus and outputting an output signal of the first QPSK modulating apparatus corresponding to the first constellation points;

a second QPSK modulating apparatus comprising:
second receiving means for receiving the complex sequence of binary digits corresponding to the symbols of the higher order modulation, the symbols corresponding to the constellation points of the higher order modulation; and
second mapping means for mapping the symbols of the higher order modulation to second constellation points of the second QPSK modulating apparatus and outputting an output signal of the second QPSK modulating apparatus corresponding to the second constellation points; and
adding means for adding the output signals of the first and second QPSK modulating apparatuses, thereby generating the constellation points of the higher order modulation.

According to a further aspect of the invention, a system and a method for generating a higher order modulation are provided. A complex sequence of binary digits corresponding to symbols of a higher order modulation is received, the symbols corresponding to constellation points of the higher order modulation. The symbols of the higher order modulation are mapped to first constellation points of a first QPSK modulation and an output signal of the first QPSK modulation corresponding to the first constellation points is output. The symbols of the higher order modulation are also mapped to second constellation points of a second QPSK modulation and an output signal of the second QPSK modulation corresponding to the second constellation points is output. The output signals of the first and second QPSK modulations are added, thereby generating the constellation points of the higher order modulation.

The invention may also be implemented as computer program.

According to the invention, higher order constellations can be generated by summing weighted QPSK symbols with constant DTX bits.

An advantage of the invention is that no new hardware is required. Furthermore, a flexible implementation is achieved, and new modulations can be quickly implemented and used. In addition, DTX bits can be constant, decreasing processing and bus loads.

For example, the invention can be implemented in a BTS (Base Transceiver Station) platform.

BRIEF DESCRIPTION OF THE DRAWINGS

FIG. 3 shows a table illustrating frame memory bits for two spreaders for building up a 16QAM using constant DTX according to the implementation example of the invention.

DESCRIPTION OF EMBODIMENTS OF THE INVENTION

The invention provides a method, an apparatus and a system for generating higher order modulations with QPSK modulations with constant weight and constant DTX.

Spreading and modulation are performed in the same operation in a transmitter. A QPSK spreader/modulator takes as an input a complex sequence of binary digits, and these digits are mapped to constellation points {1−j; 1+j; −1+j; −1−j} and multiplied with a weighting coefficient. A signal is spread by multiplying it with spreading code. Weighting coefficients are of two kinds: real valued for tuning of amplitude only, and complex valued for tuning of phase.

Figure 1:
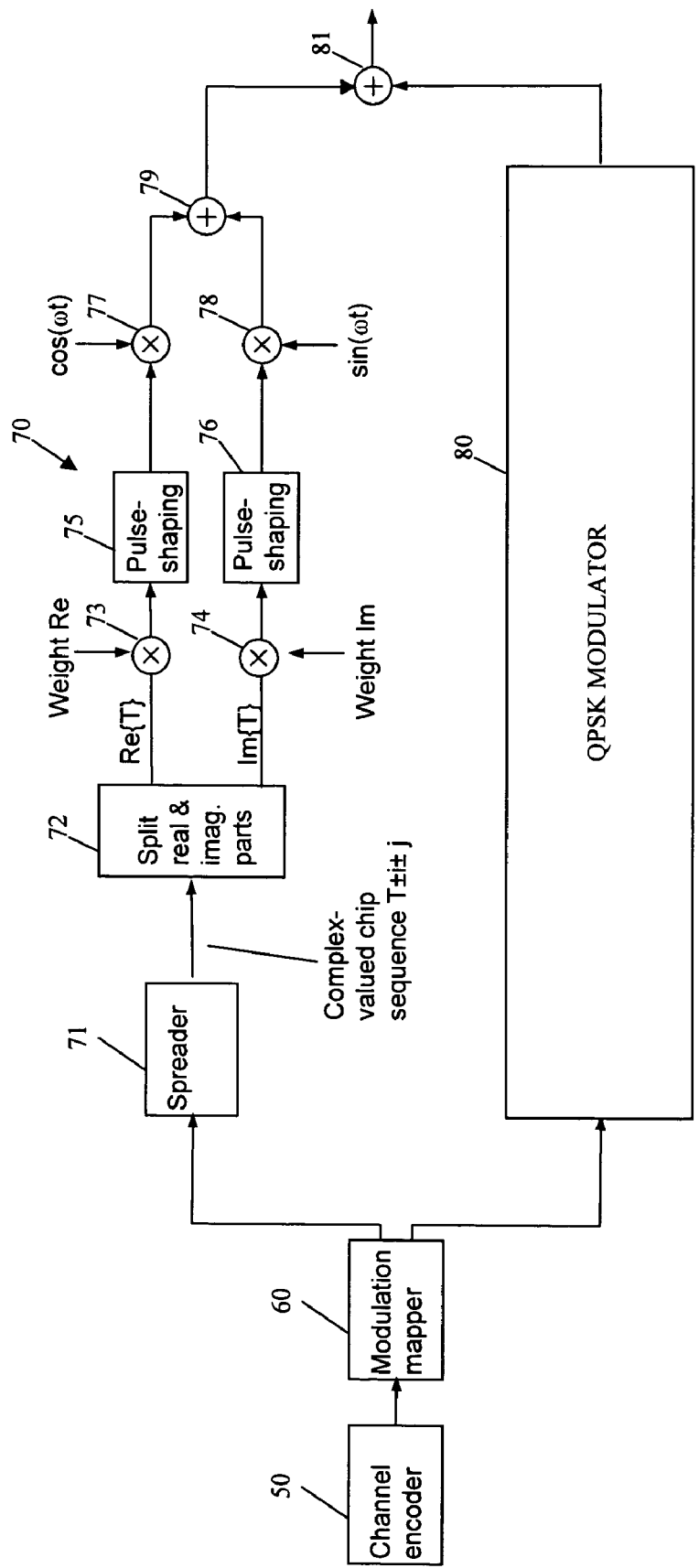
FIG. 1 shows a schematic block diagram illustrating two QPSK modulators connected together according to an embodiment of the invention.

FIG. 1 shows an embodiment of a system or a device in accordance with the invention. Modulation mapper 60 maps binary sequences from channel encoder 50 for two QPSK modulators 70, 80. The structure of the QPSK modulator 70 is shown in detail. The structure of the QPSK modulator 80 is the same as that of the modulator 70.

As shown in FIG. 1, each modulator 70, 80 comprises a spreader 71 and a splitter 72 for splitting the input signals in their real parts RE{T} and imaginary parts IM{T}. The real parts RE{T} and imaginary parts IM{T} are applied to a multiplier 73, 74, respectively, for multiplication with a weighting coefficient Weight Re, Weight Im, respectively. The outputs of the multipliers 73, 74, are applied to a pulse shaper 75, 76, respectively, for pulse shaping.

The output of the pulse shaper 75 is applied to a multiplier 77 for multiplication with cos(ωt), whereas the output of the pulse shaper 76 is applied to a multiplier 78 for multiplication with sin(ωt). The outputs of the multipliers 77, 78, are additively combined by an adder 79 to provide an output signal of the QPSK modulator 70 which is applied to an adder 81. The output signal of the QPSK modulator 80 is likewise supplied to an input of the adder 81 which provides the final output of the QPSK modulator arrangement in accordance with an embodiment of the invention.

Constellation points of a higher order modulation are mapped by the modulation mapper 60 to inputs (1,−1) of weighted QPSK modulators. After modulation and spreading the QPSK symbols are summed to compose higher order modulation symbols. Because the QPSK modulated sequences have same spreading code, and spreading is a linear operation, they can be summed up.

According to an implementation example of the invention, the higher order modulation is a 16QAM modulation. For every constellation point of the 16QAM, both QPSK modulators 70 and 80 are used. This means that DTX bits are not required for disabling any branches of the QPSK modulators. In other words, each branch of the QPSK modulators is ≠0 when generating the higher order modulation. Moreover, the weights of the QPSK spreaders/modulators can be constant for different 16QAM symbols.

The implementation example for building up the 16QAM modulation using the arrangement of FIG. 1 is described in greater detail below by referring to FIGS. 2 and 3.

Figure 2:
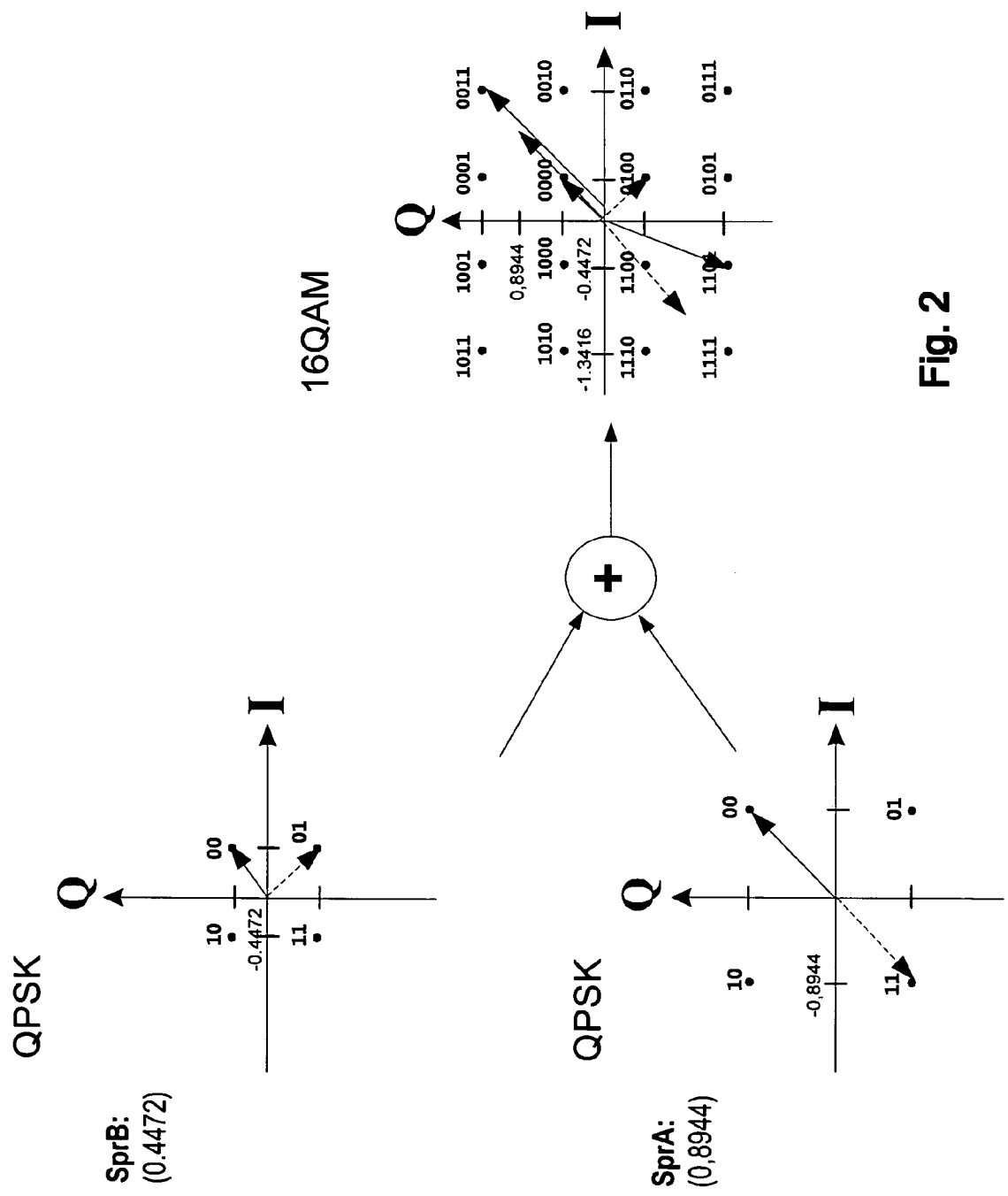
FIG. 2 shows a diagram illustrating constellation points of a 16QAM built up by using two spreaders A and B with constant weights and constant DTX according to an implementation example of the invention.
Figure 4:
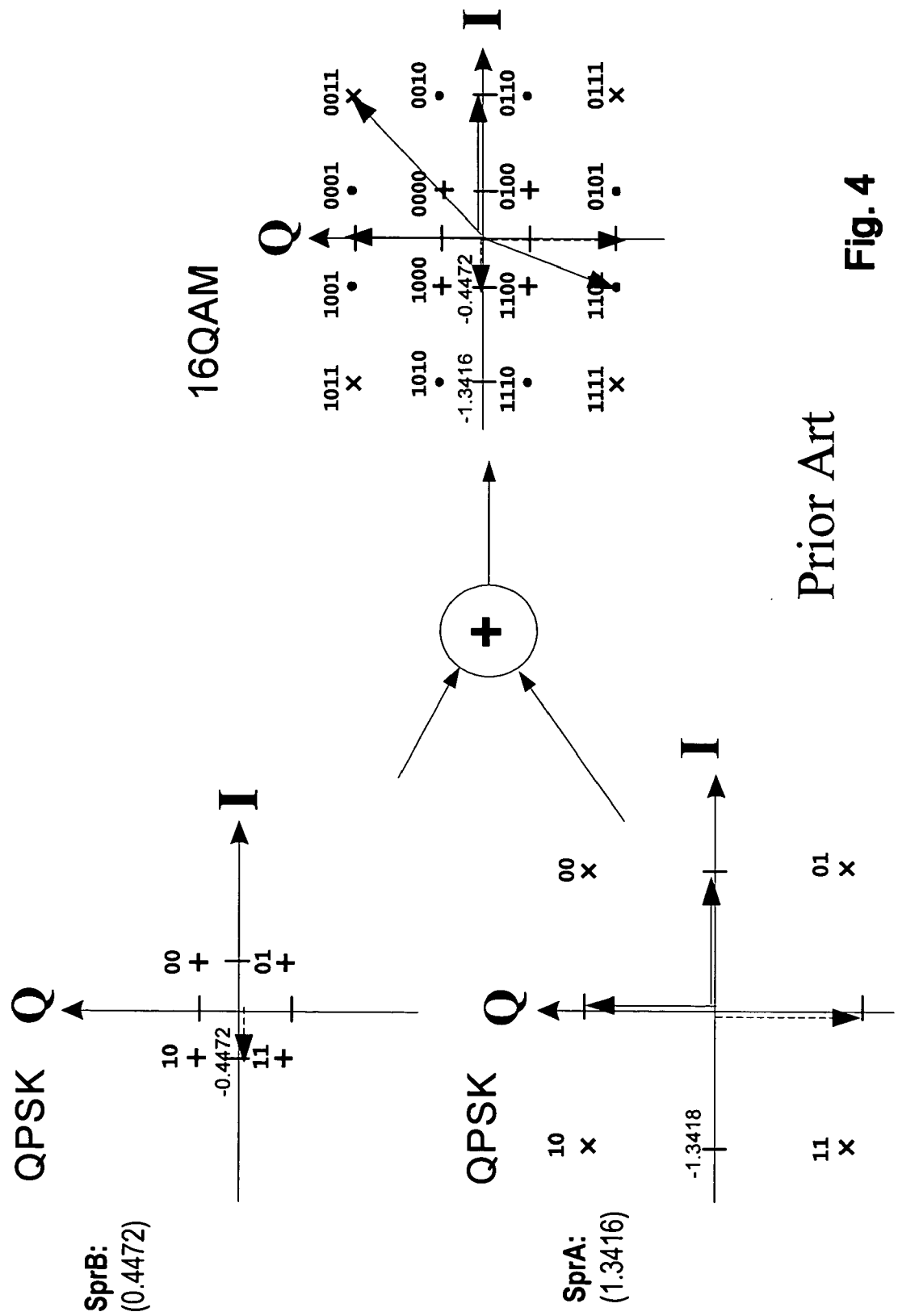
FIG. 4 shows a diagram illustrating constellation points of a 16QAM built up by using two spreaders with constant weights and variable DTX according to the prior art.

FIG. 2 shows a constellation diagram of a 16QAM which is generated by using two QPSK modulators with constant weights and constant DTX. The QPSK modulators SprA and SprB may be formed by the modulators 70 and 80 of FIG. 1.

The QPSK modulator SprA applies a weight of 0.8944 to the real and imaginary branches (weight Re=weight Im=0.8944), so that QPSK symbols 00, 10, 11 and 01 are mapped to the constellation points (0.8944+j0.8944), (−0.8944+j0.8944), (−0.8944−j0.8944) and (0.8944−j0.8944) of the QPSK modulator SprA as shown in FIG. 2.

Similarly, the QPSK modulator SprB applies a weight of 0.4472 to the real and imaginary branches (weight Re=weight Im=0.4472), so that QPSK symbols 00, 10, 11 and 01 are mapped to the constellation points (0.4472+j0.4472), (−0.4472+j0.4472), (−0.4472−j0.4472) and (0.4472−j0.4472) of the QPSK modulator SprB as shown in FIG. 2.

FIG. 3 shows a table illustrating frame memory bits for the two spreaders SprA and SprB of FIG. 2 when they are used for building up a 16QAM according to the invention.

As shown in FIGS. 2 and 3, constellation points of a 16QAM are mapped to inputs (1,−1) of the weighted QPSK modulators SprA and SprB. The two QPSK modulators SprA and SprB are used for every constellation point of the 16QAM. Thus, DTX bits are not required for disabling any branches of the QPSK modulators. In this case the weights of the QPSK spreaders/modulators can be constant for different 16QAM symbols, SprA having two times (i.e. 6.0 dB) bigger weights than SprB. The table shown in FIG. 3 describes how different 16QAM symbols can be built up using both spreaders SprA, SprB without DTX. In practice, a quadrant of the 16QAM constellation is chosen by SprA, and a symbol of the selected quadrant is chosen by SprB.

Referring to the table shown in FIG. 3, in the first column the possible 16QAM symbols $i_1 q_1 i_2 q_2$ are listed. In correspondence thereto, in the second and third columns the I-branch and Q-branch weights of the 16QAM as shown in the right part of FIG. 2 are listed. In the fourth to seventh columns of the table the inputs of the weighted QPSK modulators SprA,I, SprA,Q, SprB,I and SprB,Q corresponding to the respective 16QAM symbols are listed.

For example, in case the binary sequence from channel encoder (FIG. 1) corresponding to the 16QAM symbol "0011" is received by the modulation mapper. The modulation mapper maps the symbol, according to FIG. 3, in the SprA 70 holds: Re{T}=1, Im{T}=1, and in the SprB holds: Re{T}=1, Im{T}=1.

Thus, referring to the constellation diagrams shown in FIG. 2, the 16QAM symbol "0011" results in a vector to the constellation point (0.8944+j0.8944) in SprA, and in a vector to the constellation point (0.4472+j0.4472) in SprB. Therefore, by summing the output of the QPSK modulators SprA 70 and SprB 80 in the adder 81, a constellation point (1.3416+j 1.3416) is obtained in the 16QAM constellation diagram for the symbol "0011".

As a further example, in case the binary sequence from channel encoder (FIG. 1) corresponding to the 16QAM symbol "1101" is received by the modulation mapper. The modulation mapper maps the symbol, according to FIG. 3, in the SprA 70 holds: Re{T}=−1, Im{T}=−1, and in the SprB holds: Re{T}=1, Im{T}=−1.

Thus, referring to the constellation diagrams shown in FIG. 2, the 16QAM symbol "1101" results in a vector to the constellation point (−0.8944−j0.8944) in SprA, and in a vector to the constellation point (0.4472−j0.4472) in SprB. Therefore, by summing the output of the QPSK modulators SprA 70 and SprB 80 in the adder 81, a constellation point (−0.4472−j1.3416) is obtained in the 16QAM constellation diagram for the symbol "1101".

For providing the 16QAM modulation by the two QPSK modulators 70 and 80 the block 60 may refer to the table shown in FIG. 3 for mapping the incoming symbols to inputs (1,−1) of the multipliers 73, 74. The table may be implemented in block 60 but can also be done in chip level in block 72.

Moreover, according to an alternative embodiment of the invention, one block 60 may be provided for two QPSK modulations which are carried out as shown in FIGS. 2 and 3.

In summary, a method, an apparatus and a system for generating a higher order modulation are disclosed. A complex sequence of binary digits corresponding to symbols of a higher order modulation is received, the symbols corresponding to constellation points of the higher order modulation. First mapping means map the symbols of the higher order modulation to first constellation points of a first QPSK modulation and output an output signal of the first QPSK modulation corresponding to the first constellation points. Similarly, second mapping means map the symbols of the higher order modulation to second constellation points of a second QPSK modulation and output an output signal of the second QPSK modulation corresponding to the second constellation points. Finally, adding means add the output signals of the first and second QPSK modulations, thereby generating the constellation points of the higher order modulation. A mapping table relating constellation points of the higher order modulation to constellation points of the first and second QPSK modulations is generated, and the first and second mapping means refer to the mapping table for mapping the symbols of the higher order modulation to the first and second constellation points, respectively.

In accordance with an embodiment of the present invention, there is provided a computer program embodied on a computer-readable medium. The program is configured to control a computer to perform receiving a complex sequence of binary digits corresponding to symbols of a higher order modulation, the symbols corresponding to constellation points of the higher order modulation. The program is also configured to perform mapping the symbols of the higher order modulation to constellation points of a quadrature phase shift keying (QPSK) modulation in order to provide an output signal of the QPSK modulation which is added to an output signal of at least one other QPSK modulation, in order to generate the constellation points of the higher order modulation. The computer program includes software code portions that are stored on the computer-readable medium and is directly loadable into an internal memory of the computer.

In accordance with another embodiment of the present invention, there is provided a computer program embodied on a computer-readable medium. The program is configured to control a computer to perform receiving a complex sequence of binary digits corresponding to symbols of a higher order modulation, the symbols corresponding to constellation points of the higher order modulation. The program is also configured to perform mapping the symbols of the higher order modulation to first constellation points of a first quadrature phase shift keying (QPSK) modulation and outputting an output signal of the first QPSK modulation corresponding to the first constellation points, and mapping the symbols of the higher order modulation to second constellation points of a second QPSK modulation and outputting an output signal of the second QPSK modulation corresponding to the second constellation points. The program is also configured to perform adding the output signals of the first and second QPSK modulations, thereby generating to generate the constellation points of the higher order modulation. The computer program includes software code portions that are stored on the computer-readable medium and is directly loadable into an internal memory of the computer.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. An apparatus, comprising:
a receiver configured to receive a complex sequence of binary digits corresponding to symbols of a higher order modulation, the symbols corresponding to constellation points of the higher order modulation, wherein the apparatus is a first quadrature phase shift keying (QPSK) modulating apparatus of two QPSK modulating apparatuses;
a first mapping unit configured to map the symbols of the higher order modulation to first constellation points of the QPSK modulating apparatus in order to provide an output signal of the first QPSK modulating apparatus which is added to an output signal of a second QPSK modulating apparatus of the two QPSK modulating apparatuses, in order to generate the constellation points of the higher order modulation; and
a first weighting unit configured to apply first weights when mapping the symbols of the higher order modulation to the first constellation points of the first QPSK modulating apparatus,
wherein the second QPSK modulating apparatus comprises a second mapping unit configured to map the symbols of the higher order modulation to second constellation points of the second QPSK modulating apparatus and output the output signal of the second QPSK modulating apparatus corresponding to the second constellation points, and a second weighting unit configured to apply second weights when mapping the symbols of the higher order modulation to the second constellation points of the second QPSK modulating apparatus,
wherein the first weights of the first QPSK modulating apparatus are two times higher than the second weights or half of the second weights applied by the second QPSK modulating apparatus.

2. The apparatus according to claim 1, wherein the first mapping unit is configured to refer to a table relating the symbols of the higher order modulation to the first constellation points of the first QPSK modulating apparatus.

3. The apparatus according to claim 1,
wherein the higher order modulation is a 16QAM modulation, wherein a first constellation point of the first QPSK modulating apparatus, to which a symbol of the 16QAM modulation is mapped, is located at a same position in a constellation diagram as a corresponding constellation point of the 16QAM modulation when an origin of the constellation diagram of the first QPSK modulating apparatus is placed at a center of those constellation points of the 16QAM modulation which belong to a quadrant in which a second constellation point of the second QPSK modulating apparatus is located.

4. A system, comprising:
a first quadrature phase shift keying (QPSK) modulating apparatus comprising a first receiver configured to receive a complex sequence of binary digits corresponding to symbols of a higher order modulation, the symbols corresponding to constellation points of the higher order modulation, and
a first mapping unit configured to map the symbols of the higher order modulation to first constellation points of the first QPSK modulating apparatus and outputting an output signal of the first QPSK modulating apparatus corresponding to the first constellation points, and a first weighting unit configured to apply first weights when mapping the symbols of the higher order modulation to the first constellation points of the first QPSK modulating apparatus;

a second QPSK modulating apparatus comprising a second receiver configured to receive the complex sequence of binary digits corresponding to the symbols of the higher order modulation, the symbols corresponding to the constellation points of the higher order modulation, and a second mapping unit configured to map the symbols of the higher order modulation to second constellation points of the second QPSK modulating apparatus and outputting an output signal of the second QPSK modulating apparatus corresponding to the second constellation points; and a second weighting unit configured to apply second weights when mapping the symbols of the higher order modulation to the second constellation points of the second QPSK modulating apparatus, the first weights being half of the second weights or the first weights being two times higher than the second weights; and an adding unit configured to add the output signals of the first and second QPSK modulating apparatuses to generate the constellation points of the higher order modulation.

5. The system according to claim 4, comprising:

a generator configured to generate a mapping table relating the constellation points of the higher order modulation to the first and second constellation points of the first and second QPSK modulating apparatuses, wherein the first and second mapping units are configured to refer to the mapping table for mapping the symbols of the higher order modulation to the first and second constellation points, respectively.

6. A method for a first QPSK modulating apparatus of two QPSK modulating apparatuses, the first QPSK modulating apparatus comprising a first mapping unit and a first weighting unit, a second QPSK modulating apparatus of the two QPSK modulating apparatuses comprising a second mapping unit and a second weighting unit, the method comprising:

receiving, a complex sequence of binary digits corresponding to symbols of a higher order modulation, the symbols corresponding to constellation points of the higher order modulation;

mapping, at the first mapping unit, the symbols of the higher order modulation to first constellation points of the first QPSK modulating apparatus in order to provide an output signal of the first QPSK modulating apparatus which is added to an output signal of the second QPSK modulating apparatus, in order to generate the constellation points of the higher order modulation; and applying weights, at the first weighting unit, when mapping the symbols of the higher order modulation to the first constellation points of the first QPSK modulating apparatus, wherein the second mapping unit of the second QPSK modulating apparatus maps the symbols of the higher order modulation to second constellation points of the second QPSK modulating apparatus and outputs the output signal of the second QPSK modulating apparatus corresponding to the second constellation points, and the second weighting unit of the second QPSK modulating apparatus applies second weights when mapping the symbols of the higher order modulation to the second constellation points of the second QPSK modulating apparatus, wherein the first weights are half of the second weights or two times higher than the second weights.

7. The method according to claim 6, comprising:

referring to a table relating the symbols of the higher order modulation to the first constellation points of the first QPSK modulating apparatus when mapping the symbols at the first mapping unit.

8. The method according to claim 6, wherein the higher order modulation is a 16QAM modulation, wherein a first constellation point of the first QPSK modulating apparatus, to which a symbol of the 16QAM modulation is mapped, is located in a same quadrant of a constellation diagram as a corresponding constellation point of the 16QAM modulation.

9. The method according to claim 6, wherein the higher order modulation is a 16QAM modulation, wherein a first constellation point of the first QPSK modulating apparatus, to which a symbol of the 16QAM modulation is mapped, is located at a same position in a constellation diagram as a corresponding constellation point of the 16QAM modulation when an origin of the constellation diagram of the first QPSK modulating apparatus is placed at a center of those constellation points of the 16QAM modulation which belong to a quadrant in which a second constellation point of the second QPSK modulating apparatus is located.

10. A method for a system comprising a first QPSK modulating apparatus and a second QPSK modulating apparatus, the first QPSK modulating apparatus comprising a first mapping unit and a first weighting unit, the second QPSK modulating apparatus comprising a second mapping unit and a second weighting unit, the method comprising:

receiving a complex sequence of binary digits corresponding to symbols of a higher order modulation, the symbols corresponding to constellation points of the higher order modulation;

mapping, at the first mapping unit, the symbols of the higher order modulation to first constellation points of the first QPSK modulating apparatus and outputting an output signal of the first QPSK modulating apparatus corresponding to the first constellation points;

mapping, at the second mapping unit, the symbols of the higher order modulation to second constellation points of the second QPSK modulating apparatus and outputting an output signal of the second QPSK modulating apparatus corresponding to the second constellation points;

applying, at the first weighting unit, first weights when mapping the symbols of the higher order modulation to the first constellation points and applying, at the second weighting unit, the second weights when mapping the symbols of the higher order modulation to the second constellation points, the first weights being half of the second weights or the first weights being two times higher than the second weights; and adding the output signals of the first and second QPSK modulating apparatuses to generate the constellation points of the higher order modulation.

11. A computer program embodied on a computer-readable medium, said program configured to control a computer to perform a method for a first QPSK modulating apparatus of two QPSK modulating apparatuses, the first QPSK modulating apparatus comprising a first mapping unit and a first weighting unit, a second QPSK modulating apparatus of the two QPSK modulating apparatuses comprising a second mapping unit and a second weighting unit, the method comprising:

receiving a complex sequence of binary digits corresponding to symbols of a higher order modulation, the symbols corresponding to constellation points of the higher order modulation;

mapping, at the first mapping unit, the symbols of the higher order modulation to first constellation points of the first QPSK modulating apparatus in order to provide an output signal of the first QPSK modulating apparatus which is added to an output signal of the second QPSK modulating apparatus, in order to generate the constellation points of the higher order modulation; and applying weights, at the first weighting unit, when mapping the symbols of the higher order modulation to the first constellation points of the first QPSK modulating apparatus, wherein the second mapping unit of the second QPSK modulating apparatus maps the symbols of the higher order modulation to second constellation points of the second QPSK modulating apparatus and outputs the output signal of the second QPSK modulating apparatus corresponding to the second constellation points, and the second weighting unit of the second QPSK modulating apparatus applies second weights when mapping the symbols of the higher order modulation to the second constellation points of the second QPSK modulating apparatus, wherein the first weights are half of the second weights or two times higher than the second weights.

12. The computer program according to claim 11, wherein the computer program is loaded into an internal memory of the computer.

13. A computer program embodied on a computer-readable medium, said program configured to control a computer to perform:

a method for a system comprising a first QPSK modulating apparatus and a second QPSK modulating apparatus, the first QPSK modulating apparatus comprising a first mapping unit and a first weighting unit, the second QPSK modulating apparatus comprising a second mapping unit and a second weighting unit, the method comprising:

receiving a complex sequence of binary digits corresponding to symbols of a higher order modulation, the symbols corresponding to constellation points of the higher order modulation;

mapping, at the first mapping unit, the symbols of the higher order modulation to first constellation points of the first QPSK modulating apparatus and outputting an output signal of the first QPSK modulating apparatus corresponding to the first constellation points;

mapping, at the second mapping unit, the symbols of the higher order modulation to second constellation points of the second QPSK modulating apparatus and outputting an output signal of the second QPSK modulating apparatus corresponding to the second constellation points;

applying, at the first weighting unit, first weights when mapping the symbols of the higher order modulation to the first constellation points and applying, at the second weighting unit, the second weights when mapping the symbols of the higher order modulation to the second constellation points, the first weights being half of the second weights or the first weights being two times higher than the second weights; and adding the output signals of the first and second QPSK modulating apparatuses to generate the constellation points of the higher order modulation.

14. The computer program according to claim 13, wherein the computer program is loaded into an internal memory of the computer.

15. An apparatus, comprising:

receiving means for receiving a complex sequence of binary digits corresponding to symbols of a higher order modulation, the symbols corresponding to constellation points of the higher order modulation, wherein the apparatus is a first quadrature phase shift keying (QPSK) modulating apparatus of two QPSK modulating apparatuses;

first mapping means for mapping the symbols of the higher order modulation to first constellation points of the QPSK modulating apparatus in order to provide an output signal of the first QPSK modulating apparatus which is added to an output signal of a second QPSK modulating apparatus of the two QPSK modulating apparatuses, in order to generate the constellation points of the higher order modulation; and first weighting means for applying first weights when mapping the symbols of the 16QAM higher order modulation to the first constellation points of the first QPSK modulating apparatus, wherein the second QPSK modulating apparatus comprises second mapping means for mapping the symbols of the higher order modulation to second constellation points of the second QPSK modulating apparatus and outputting the output signal of the second QPSK modulating apparatus corresponding to the second constellation points, and second weighting means for applying second weights when mapping the symbols of the higher order modulation to the second constellation points of the second QPSK modulating apparatus, wherein the first weights of the first QPSK modulating apparatus are two times higher than the second weights or half of the second weights applied by the second QPSK modulating apparatus.

16. A system, comprising:

a first quadrature phase shift keying (QPSK) modulating apparatus comprising first receiving means for receiving a complex sequence of binary digits corresponding to symbols of a higher order modulation, the symbols corresponding to constellation points of the higher order modulation, first mapping means for mapping the symbols of the higher order modulation to first constellation points of the first QPSK modulating apparatus and outputting an output signal of the first QPSK modulating apparatus corresponding to the first constellation points, and first weighting means for applying first weights when mapping the symbols of the higher order modulation to the first constellation points of the first QPSK modulating apparatus;

a second QPSK modulating apparatus comprising second receiving means for receiving the complex sequence of binary digits corresponding to the symbols of the higher order modulation, the symbols corresponding to the constellation points of the higher order modulation, second mapping means for mapping the symbols of the higher order modulation to second constellation points of the second QPSK modulating apparatus and outputting an output signal of the second QPSK modulating apparatus corresponding to the second constellation points, and second weighting means for applying second weights when mapping the symbols of the higher order modulation to the second constellation points of the second QPSK modulating apparatus, the first weights being half of the second weights or the first weights being two times higher than the second weights; and adding means for adding the output signals of the first and second QPSK modulating apparatuses to generate the constellation points of the higher order modulation.

* * * * *